United States Patent
Pohutsky et al.

(10) Patent No.: US 8,032,166 B2
(45) Date of Patent: *Oct. 4, 2011

(54) WIRELESS NETWORK LOCATION-BASED REFERENCE INFORMATION

(75) Inventors: Joseph Pohutsky, Annapolis, MD (US); Joel Groen, Seattle, WA (US); Steve Helme, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/929,823

(22) Filed: Feb. 17, 2011

(65) Prior Publication Data

US 2011/0143780 A1    Jun. 16, 2011

Related U.S. Application Data

(63) Continuation of application No. 10/623,156, filed on Jul. 21, 2003, now Pat. No. 7,899,473.

(51) Int. Cl.
*H04Q 7/20* (2006.01)

(52) U.S. Cl. ............. 455/466; 455/435; 455/456.1; 455/456.2; 455/456.3; 455/456.5

(58) Field of Classification Search ............ 455/466, 455/456.1, 456.2
See application file for complete search history.

(56) References Cited

U.S. PATENT DOCUMENTS

| | | | |
|---|---|---|---|
| 4,910,767 A | 3/1990 | Brugliera | |
| 5,224,150 A | 6/1993 | Neustein | |
| 5,430,759 A | 7/1995 | Yokev | |
| 5,485,163 A * | 1/1996 | Singer et al. | 342/457 |
| 5,774,802 A | 6/1998 | Tell | |
| 5,825,283 A | 10/1998 | Camhi | |
| 6,131,028 A | 10/2000 | Whitington | |
| 6,321,091 B1 | 11/2001 | Holland | |
| 6,456,852 B2 | 9/2002 | Bar et al. | |
| 6,526,335 B1 | 2/2003 | Treyz | |

(Continued)

FOREIGN PATENT DOCUMENTS

WO    WO2005/051033    6/2005

OTHER PUBLICATIONS

Qualcomm CDMA Technologies, LBS Control Plane Overview—80-VD378-1NP B, 2006, pp. 1-36.

(Continued)

*Primary Examiner* — Charles Shedrick
(74) *Attorney, Agent, or Firm* — William H. Bollman

(57) ABSTRACT

The present invention provides a '411xx' value added service to wireless users. The disclosed '411xx' service allows a mobile user who may be unfamiliar with their current geographic location to nevertheless obtain quick, accurate, and current information relating to the geographic area, e.g., different services in their current location, stores, libraries, gas stations, etc., via a mobile terminated (MT) short message system (SMS) message. In addition to the traditional '4-1-1' dialed digits, a mobile user would also dial a number (or numbers) representing a feature code for a particular service, e.g., nearby ATMs, or traffic information. Upon receiving a 411xx call, the MSC generates an ORREQ/TCAP trigger based on a translation of the requested service represented by the extra 'xx' digits. The 411xx call is terminated on the MSC after an audible whisper notice plays to the caller, e.g., "thank you for calling, your requested information will be sent momentarily".

1 Claim, 4 Drawing Sheets

U.S. PATENT DOCUMENTS

| | | | |
|---|---|---|---|
| 6,529,722 B1 | 3/2003 | Heinrich |
| 6,560,456 B1 | 5/2003 | Lohtia et al. |
| 6,584,307 B1 | 6/2003 | Antonucci |
| 6,650,901 B1 | 11/2003 | Schuster |
| 6,678,357 B2 | 1/2004 | Stumer |
| 6,744,856 B2 | 6/2004 | Karnik |
| 6,744,858 B1 | 6/2004 | Ryan |
| 6,771,742 B2 | 8/2004 | McCalmont et al. |
| 6,799,049 B1 | 9/2004 | Zellner |
| 6,816,580 B2 | 11/2004 | Timmins |
| 6,868,074 B1 | 3/2005 | Hanson |
| 6,940,950 B2 | 9/2005 | Dickinson |
| 6,963,557 B2 | 11/2005 | Knox |
| 7,106,717 B2 | 9/2006 | Rousseau et al. |
| 7,130,383 B2 | 10/2006 | Naidoo et al. |
| 7,145,462 B2 | 12/2006 | Dewing |
| 7,180,415 B2 | 2/2007 | Bankert |
| 7,245,216 B2 | 7/2007 | Burkley |
| 7,317,705 B2 | 1/2008 | Hanson |
| 7,366,157 B1 | 4/2008 | Valentine |
| 7,440,442 B2 | 10/2008 | Grabelsky |
| 2001/0049274 A1 | 12/2001 | Degraeve |
| 2002/0156732 A1 | 10/2002 | Odijk |
| 2003/0086539 A1 | 5/2003 | McCalmont |
| 2003/0100320 A1 | 5/2003 | Ranjan |
| 2003/0125042 A1 | 7/2003 | Olrik |
| 2003/0147537 A1 | 8/2003 | Jing et al. |
| 2004/0092250 A1 | 5/2004 | Vallopillil |
| 2004/0103431 A1 | 5/2004 | Davenport |
| 2004/0132465 A1 | 7/2004 | Mattila |
| 2004/0199614 A1 | 10/2004 | Shenfield |
| 2004/0203922 A1 | 10/2004 | Hines et al. |
| 2004/0235493 A1 | 11/2004 | Ekerborn |
| 2005/0020287 A1 | 1/2005 | Pohutsky |
| 2005/0135569 A1 | 6/2005 | Dickinson |
| 2005/0201528 A1 | 9/2005 | Meer |
| 2006/0183460 A1 | 8/2006 | Srinivasan et al. |
| 2006/0276168 A1 | 12/2006 | Fuller |
| 2007/0197231 A1 | 8/2007 | Lin |
| 2007/0253429 A1 | 11/2007 | James |
| 2009/0003535 A1 | 1/2009 | Grabelsky |

OTHER PUBLICATIONS

Bhalla et al., TELUS, Technology Strategy—LBS Roaming Summit, Sep. 19, 2006.
Alfredo Aguirre, Ilusacell, First and Only Carrier in Mexico with a 3G CDMA Network, 2007.
Mike McMullen, Sprint, LBS Roaming Summit, Sep. 9, 2006.
Andrew Yeow, BCE, LBS Roaming Summit, Sep. 19, 2006, pp. 1-8.
Nars Harran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
Qualcomm CDMA Technologies, MS Resident User Plane LBS Roaming—80-VC718-1 E, 2006, pp. 1-37.
International Search Report in PCT/US2007/23243 dated Apr. 2, 2008.

* cited by examiner

WIRELESS NETWORK LOCATION-BASED REFERENCE INFORMATION

This application is a continuation of U.S. application Ser. No. 10/623,156, to POHUTSKY et al., entitled "Wireless Network Location-Based Reference Information," filed on Jul. 21, 2003 now U.S. Pat. No. 7,899,473, which is expressly incorporated herein by reference.

BACKGROUND OF THE INVENTION

1. Field of the Invention

This invention relates generally to the field of wireless telecommunications. More particularly, it relates to a system and method for implementing a location-related information service in a wireless phone network, particularly with respect to short messaging systems (SMS), IS-41C, and location-enabled content pulls.

2. Background of Related Art

In todays world, wireless devices such as wireless telephones play an important role. Much information is but a phone call away.

One service that a wireless device can provide is information relating to a particular area. For instance, if one were traveling or otherwise in an unfamiliar area and wanted to locate a nice restaurant, perhaps a friendly inquisition of a gas station attendant might be helpful. Or, advertising signs might be the basis for selection of a good meal. A phone book is also a conventional way to find a particular service.

Wireless devices have provided the ability to determine the location of services in an area much more conveniently. For instance, one existing wireless device technology uses mobile originated short messaging system (SMS) techniques. In this conventional technique, a user drafts and sends a text message to a particular service to which they subscriber. The text message that the user writes must include the type of content desired, together with basic information regarding a broadly defined location of the user, e.g., zip code, city or state.

Unfortunately, conventional techniques require the user to know their geographic location at any particular time, and to enter that geographic location as well as the particular type information sought via their mobile originated short message system (SMS) service. This knowledge is often difficult if not impossible to obtain accurately, and the required inputs are cumbersome and extensive.

There is a need for a mobile system that is capable of quick, accurate, and easily obtained location-based information.

SUMMARY OF THE INVENTION

In accordance with the principles of the present invention, a method and apparatus for providing location-based reference information in a wireless network comprises receiving an information telephone call from a subscriber. A telephone number initiating the telephone call includes at least one auxiliary digit beyond those associated with the information telephone call. A location-based wireless service is used to obtain a location of the subscriber. A short message relating to the location is retrieved based on requested information associated with the auxiliary digit(s). The retrieved short message is transmitted to the subscriber.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a '411xx' value added service to wireless users. The disclosed '411xx' service allows a mobile user who may be unfamiliar with their current geographic location to nevertheless obtain desired information.

In accordance with the principles of the present invention, a mobile user is provided with quick, accurate, and current information relating to the geographic area, e.g., different services in their current location, stores, libraries, gas stations, etc., via a mobile terminated (MT) short message system (SMS) message.

The present invention is a variant of the traditional directory assistance information service call 4-1-1. In accordance with an embodiment of the present invention, in addition to the traditional '4-1-1' dialed digits, a mobile user would also dial a number (or numbers) representing a feature code for a particular service. Example services might be 'nearby automated teller machines (ATMs)', or 'local traffic information'.

The 'xx' in the '411xx' service name represents two digits by way of example only. More than 2 extra digits may be implemented within the principles of the present invention, as may only a single extra digit in extremely simple systems.

Upon receiving a 411xx call, the mobile switching center (MSC) generates an ORREQ/TCAP trigger based on a translation of the requested service represented by the extra 'xx' digits. For a GSM system, this could be an ISUP based trigger, or a GSM message such as initialDP.

The 411xx call is terminated on the MSC after an audible whisper notice plays to the caller, e.g., "thank you for calling, your requested information will be sent momentarily".

Auxiliary benefits arise from the present invention as well. For instance, by virtue of terminating a request for services call at the relevant MSC, long distance charges are likely avoided. Moreover, in many subscriber plans, no airtime charges to the subscriber would apply.

Figure 1:
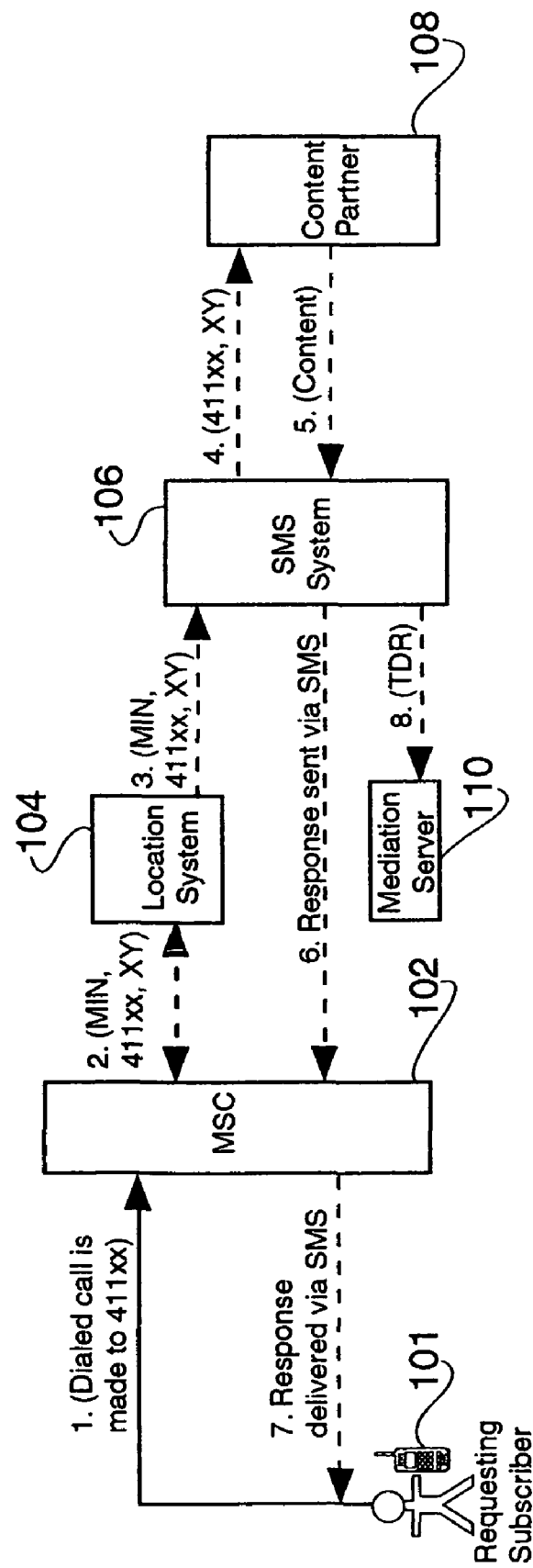
FIG. 1 shows the four main components of an exemplary 411xx system in accordance with the principles of the present invention.

FIG. 1 shows four main components of an exemplary 411xx system in accordance with the principles of the present invention.

In particular, as shown in FIG. 1, an exemplary 411xx system has four major components: an application handling mobile switching center (MSC) feature code translations 102, a location system 104, a Short Messaging System (SMS) system 106, and a content provider 108.

In operation, as shown in step 1 of FIG. 1, a subscriber 101 requests directed information by dialing '411xx' on his or her wireless telephone. The 411xx dialed number comprises lead digits of '411' (traditionally a telephone number for phone number information), followed by two (or more) trailing digits (i.e., 'XX').

In step 2, the 411xx telephone call is passed in an ORREQ/TCAP message to the location system 104, and then on to the SMS system 106 as shown in step 3.

In step 4, the SMS system 106 requests content from the relevant content provider 108.

In step 5, the content provider 108 packages the requested content information into an SMS message back to the SMS system 106.

In step 6, the SMS system 106 forwards the SMS message including the requested content information to the MSC 102 servicing the subscriber 101.

In step 7, the SMS message response is delivered to the subscriber 101 from the MSC 102.

Step 8 depicts TDR messages being transmitted by the SMS system 106 to the billing mediation server 110.

FIG. 1 also depicts a step 0, which relates to the use of a 411xx service in conjunction with advertising. In this application, once a subscriber sees, hears or is otherwise informed of particular 411xx information via advertising, he or she becomes induced into dialing the relevant 411xx telephone number.

Figure 2:
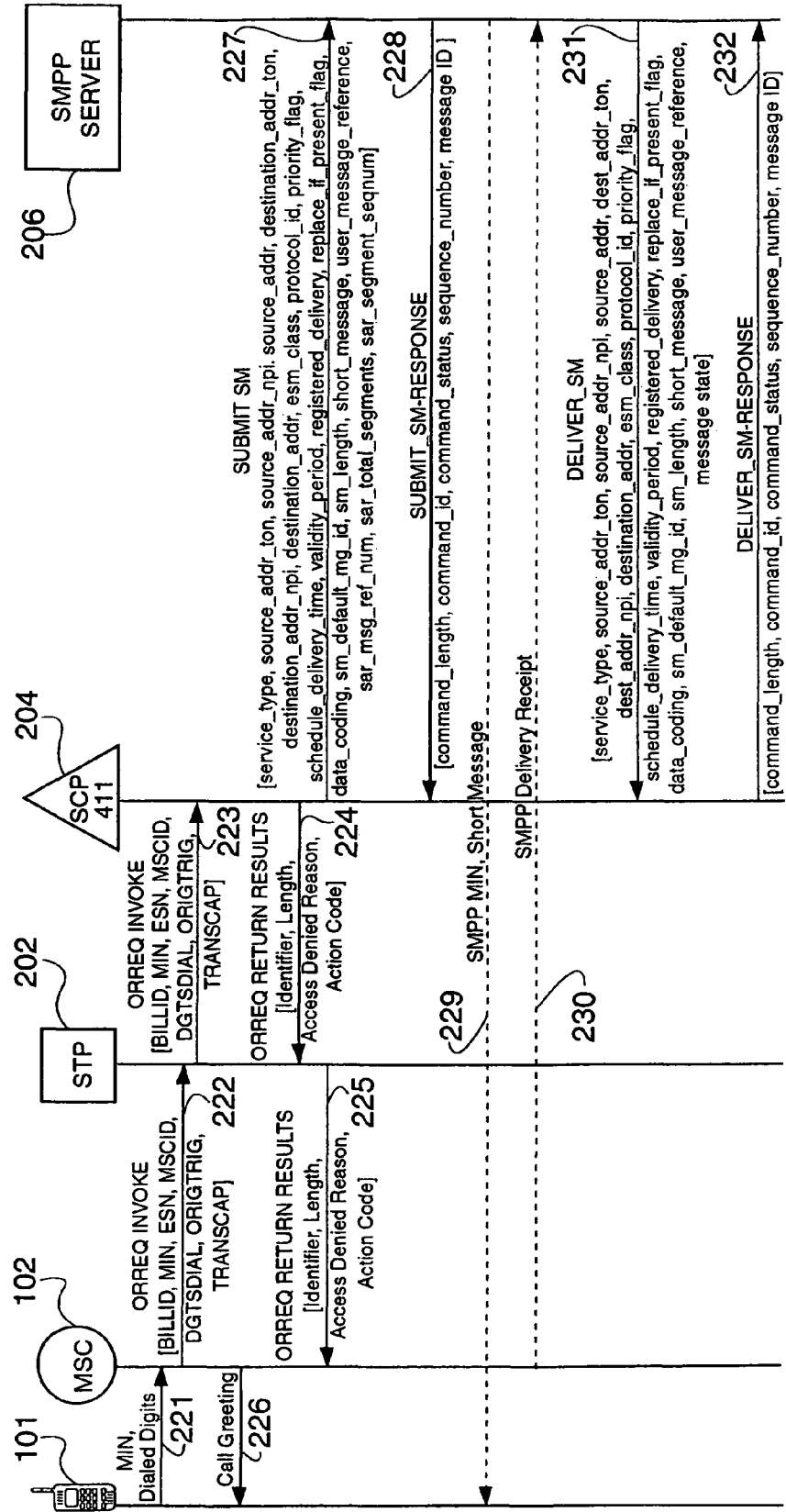
FIG. 2 is an exemplary 411xx call flow ladder diagram for the exemplary 411xx system shown in FIG. 1.

FIG. 2 is an exemplary 411xx call flow ladder diagram for the exemplary 411xx system shown in FIG. 1. This is an ANSI-only call, and is used for exemplary purposes only. The present invention relates equally to GSM call flow.

In particular, as shown in step 221, a subscriber 101 makes a phone call with 411xx dialed digits, that is transmitted to the servicing MSC 102.

In step 222, an ORREQ INVOKE message is transmitted from the MSC 102 to a STP 202, with relevant parameters for an otherwise conventional ORREQ INVOKE message, including [BILLID, MIN, ESN, MSCID, DGTSDIAL, ORIGTRIG, and TRANSCAP]

In step 223, the STP 202 passes the ORREQ INVOKE message to an SCP 411 204. The SCP 411 204 returns an ORREQ RETURN RESULTS message with relevant parameters [identifier, Length, AccessDeniedReason, and ActionCode]

In step 225, the STP 202 passes the ORREQ RETURN RESULTS message with relevant parameters [AccessDeniedReason and ActionCode] to the MSC 102.

In step 227, the SCP 204 sends a SUBMIT_SM message to the relevant SMPP server 206 including relevant parameters, e.g., [service_type, source_addr_ton, source_addr_npi, source_addr, destination_addr_ton, destination_addr_npi, destination_addr, esm_class, protocol_id, priority_flag, schedule_delivery_time, validity_period, registered_delivery, replace_if_present_flag, data_coding, sm_default_mg_id, sm_length, short_message, user_message_reference, sar_msg_ref_num, sar_total_segments, sar_segment_seqnum]

In step 228, the SMPP server 206 returns a SUBMIT_SM-RESPONSE message, including relevant parameters [command_length, command_id, command_status, sequence_number, and message_ID]

In step 229, the SMPP server 206 transmits the SMPP MIN, Short Message to the subscriber 101.

In step 230, a SMPP Delivery Receipt is transmitted by the MSC 102 to the SMPP server 206.

In step 231, a DELIVER_SM message is transmitted by the SMPP server 206 to the SCP 204, including relevant parameters [service type, source_addr_ton, source_addr_npi, source_addr, dest_addr_ton, dest_addr_npi, destination_addr, esm_class, protocol_id, priority_flag, schedule_delivery_time, validity_period, registered_delivery, replace_if_present_flag, data_coding, sm_default_mg_id, sm_length, short_message, user_message_reference, and message_state]In step 232, the SCP 204 returns a DELIVER_SM-RESPONSE message back to the SMPP server 206, including the relevant parameters [command_length, command_id, command_status, sequence_number, and message_ID]

Figure 3A:
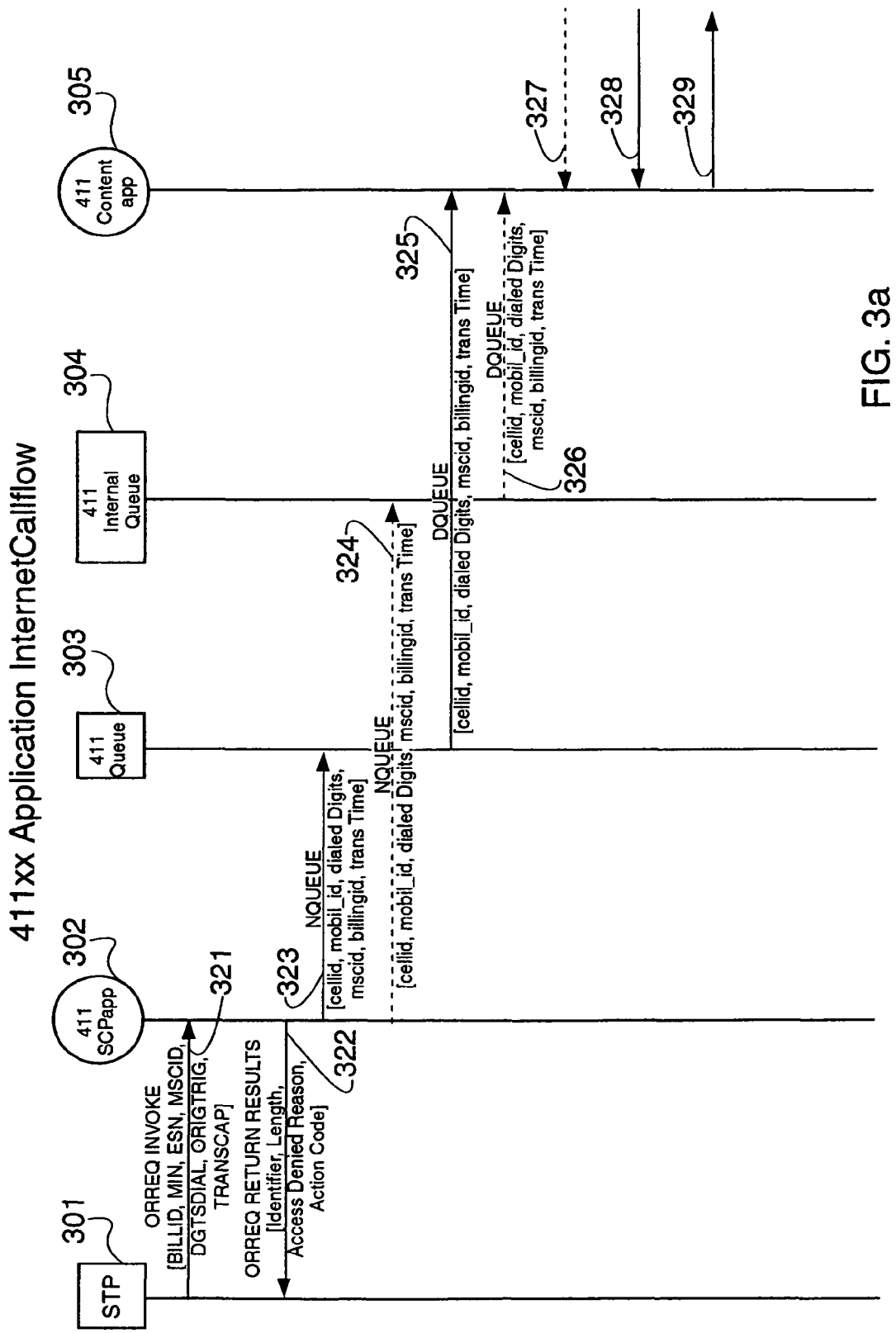
FIG. 3 shows an exemplary 411xx application internal call flow for the exemplary 411xx system shown in FIG. 1.
Figure 3B:
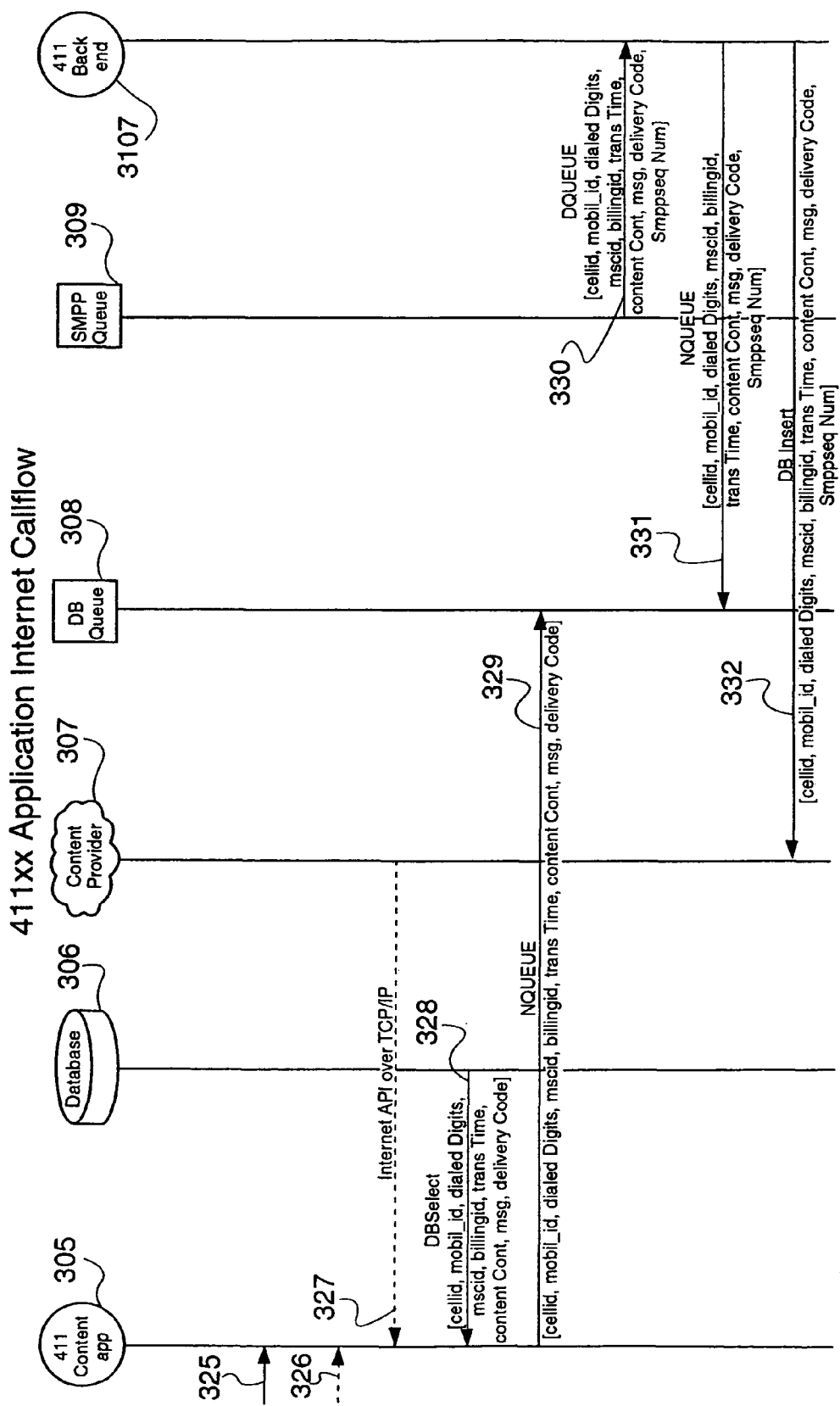

FIG. 3 shows an exemplary 411xx application internal call flow for the exemplary 411xx system shown in FIG. 1.

In particular, as shown in step 321 of FIG. 3, an ORREQ INVOKE message is passed from the STP 301 to a 411 SCPapp 302, including relevant parameters [BILLID, MIN, ESN, MSCID, DGTSDIAL, ORIGTRIG, and TRANSCAP]

In step 322, an ORREQ RETURN RESULTS message is passed by the 411 SCPapp 302 back to the STP 301, including relevant parameters [Identifier, Length, AccessDeniedReason, and ActionCode]

In step 323, a NQUEUE message is transmitted by the 411 SCPapp 302 to the 411 Queue 303, including relevant parameters [cellid, mobil_id, dialedDigits, mscid, billingid, and transTime]

In step 324, the 411 SCPapp 302 transmits a NQUEUE message to a 411 internal queue 304, including relevant parameters [cellid, mobil_id, dialedDigits, mscid, billingid, transTime]

In step 325, a DQUEUE message is transmitted by the 411 queue 303 to the 411 content application 305, including relevant parameters [cellid, mobil_id, dialedDigits, mscid, billingid, and transTime]

In step 326, a DQUEUE message is transmitted by the 411 internal queue 304 to the 411 content application 305, including relevant parameters [cellid, mobil_id, dialedDigits, mscid, billingid, and transTime]

In step 327, an Internet API over TCP/IP message is transmitted by the content provider 307 back to the 411 content application 305.

In step 328, a DBSelect message is transmitted from a database 306 to the 411 content application 305, including relevant parameters cellid, mobil_id, dialedDigits, mscid, billingid, transTime, contentCont, msg, and deliveryCode].

In step 329, an NQUEUE message is transmitted from the 411 content application 305 to the SMPP queue 309, including relevant parameters [cellid, mobil_id, dialedDigits, mscid, billingid, transTime, contentCont, msg, and deliveryCode]

In step 330, a DQUEUE message is transmitted from the MSPP Queue 309 to the 411 back end 310, including relevant parameters cellid, mobil_id, dialedDigits, mscid, billingid, transTime, contentCont, msg, deliveryCode, and SmppseqNum]

In step 331, a NQUEUE message is transmitted from the 411 back end 310 to the DB Queue 308, including relevant parameters cellid, mobil_id, dialedDigits, mscid, billingid, transTime, contentCont, msg, deliveryCode, and SmppseqNum]

In step 332, a DBinsert message is transmitted from the 411 back end 310 to the database 306, including relevant parameters [cellid, mobil_id, dialedDigits, mscid, billingid, transTime, contentCont, msg, deliveryCode, and SmppseqNum]

The present invention is applicable for any mobile device that supports mobile terminated SMS (MT SMS), or any wireless telephone capable of receiving short message system (SMS), EMS or MMS messages. It has applicability with, e.g., call center based concierge services, and text based 4-1-1 services.

The inventive system is relatively easy and affordable for the mobile operator to implement.

In accordance with the principles of the present invention, the short messaging may be combined with audio passages based on the particular application.

While the invention has been described with reference to the exemplary embodiments thereof, those skilled in the art will be able to make various modifications to the described embodiments of the invention without departing from the true spirit and scope of the invention.

What is claimed is:

1. A method of providing location-based reference information in a wireless network, comprising:

receiving an information telephone call from a subscriber, a telephone number initiating said telephone call including at least one auxiliary digit beyond those associated with the information telephone call;

using a location-based wireless service to obtain a location of said subscriber;

retrieving a short message relating to said location based on requested information associated with said at least one auxiliary digit; and transmitting said retrieved short message to said subscriber;

wherein at least two auxiliary digits are included with said information telephone call; and said information telephone call is initiated with dialed digits "4-1-1".

* * * * *